(12) United States Patent
Kobielski et al.

(10) Patent No.: US 12,258,900 B2
(45) Date of Patent: Mar. 25, 2025

(54) METHODS AND SYSTEMS FOR AN ELECTRIC TURBOCHARGER

(71) Applicant: Transportation IP Holdings, LLC, Norwalk, CT (US)

(72) Inventors: Louis Kobielski, Sherman, NY (US); Christopher Homison, Wattsburg, PA (US); Adam Felton, Grove City, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 26 days.

(21) Appl. No.: 18/160,832

(22) Filed: Jan. 27, 2023

(65) Prior Publication Data

US 2023/0287833 A1    Sep. 14, 2023

Related U.S. Application Data

(60) Provisional application No. 63/269,237, filed on Mar. 11, 2022.

(51) Int. Cl.
| | |
|---|---|
| *F02B 77/08* | (2006.01) |
| *F02B 37/10* | (2006.01) |
| *F02B 37/12* | (2006.01) |
| *F02B 39/10* | (2006.01) |
| *F02B 39/16* | (2006.01) |
| *F02D 41/00* | (2006.01) |

(52) U.S. Cl.
CPC ............ *F02B 77/083* (2013.01); *F02B 37/10* (2013.01); *F02B 37/12* (2013.01); *F02B 39/10* (2013.01); *F02B 39/16* (2013.01); *F02D 41/0007* (2013.01)

(58) Field of Classification Search
CPC ........ F02B 77/083; F02B 37/10; F02B 37/12; F02B 39/10; F02B 39/16; F02D 41/0007; F02D 41/22; F02D 41/221; F02D 23/005
See application file for complete search history.

(56) References Cited

U.S. PATENT DOCUMENTS

| | | | | |
|---|---|---|---|---|
| 4,965,513 A | * | 10/1990 | Haynes | ............... F16K 37/0083 |
| | | | | 73/1.72 |
| 6,688,104 B2 | * | 2/2004 | Baeuerle | ............. F02D 13/0261 |
| | | | | 123/520 |
| 2018/0334954 A1 | * | 11/2018 | Banker | .................... F02B 39/10 |
| 2019/0316538 A1 | * | 10/2019 | Martin | .................... F01N 13/10 |

OTHER PUBLICATIONS

Fossum, D. et al., "Identifying Mechanical Faults with Motor Current Signature Analysis," Reliable Plant Website, Available Online at https://www.reliableplant.com/Read/28633/motor-current-signature-analysis, Available as Early as Dec. 1, 2011, 10 pages.

* cited by examiner

*Primary Examiner* — Loren C Edwards
(74) *Attorney, Agent, or Firm* — K&L Gates (57) ABSTRACT

Methods and systems are provided for an electric turbocharger (e-turbo). In one example, a method may include monitoring an e-turbo parameter or an engine parameter, comparing the monitored e-turbo or engine parameter to a determined threshold value for the e-turbo or engine parameter, and signaling a status of the e-turbo in response to the monitored e-turbo or engine parameter differing from the determined threshold value by at least a threshold amount.

17 Claims, 6 Drawing Sheets

METHODS AND SYSTEMS FOR AN ELECTRIC TURBOCHARGER

CROSS REFERENCE TO RELATED APPLICATIONS

The present application claims priority to U.S. Provisional Application No. 63/269,237, entitled "METHODS AND SYSTEMS FOR AN ELECTRIC TURBOCHARGER", and filed on Mar. 11, 2022. The entire contents of the above-listed application are hereby incorporated by reference for all purposes.

TECHNICAL FIELD

Embodiments of the subject matter disclosed herein relate to turbocharged internal combustion engines, and more specifically, to diagnostics of an electric turbocharger.

DISCUSSION OF ART

Some vehicles with an internal combustion engine (also referred to simply as the engine) may use a turbocharger. One type of turbocharger is an electric turbocharger, also referred herein as e-turbo. The e-turbo may include a turbine which may be powered via an electric motor and a compressor connected to the turbine. The e-turbo differs from a regular turbocharger in that it may selectively extract excess energy from the exhaust for electrical power or provide additional energy to the compressor through the electric motor. An exhaust gas flow may power the compressor, via spinning the turbine, to provide compressed air to one or more cylinders of the engine. Compressing air in this manner may increase a power and torque of the engine.

In examples where the electric turbocharger may contribute to a change in system performance, limited solutions exist for diagnosing possible causes. Strategies for diagnosing e-turbo performance change include disassembly (e.g., teardown) and physical inspection of the e-turbo components driving costly downtime in the field in some examples. Methods and systems for diagnosing e-turbo performance based on monitoring one or more system parameters with the e-turbo selectively driven via the motor (e.g., driven independent of exhaust gas) may mitigate some of the aforementioned challenges. It may be desirable to have a system and method that differs from those that are currently available.

BRIEF DESCRIPTION

In one embodiment, a method is provided that includes monitoring an electric turbocharger (e-turbo) parameter or an engine parameter, comparing the monitored e-turbo or engine parameter to a determined threshold value for the e-turbo or engine parameter and signaling a status of the e-turbo in response to the monitored e-turbo or engine parameter differing from the determined threshold by at least a threshold amount.

DETAILED DESCRIPTION

This description and embodiments of the subject matter disclosed herein relate to methods and systems for operating an internal combustion engine (ICE) with an electric turbocharger. The turbocharger may be selectively driven via an electric machine (motor) or exhaust gas (or both). The electric turbocharger is also referred to as an e-turbo. Aspects of the invention may reduce service time and repair costs associated with diagnosing electric turbochargers.

A technical effect for monitoring one or more system parameters with the e-turbo driven via the motor is that anomalous performance may be detected earlier and easier relative to previous examples. In some examples, earlier and easier diagnoses of e-turbo performance changes may allow technicians to identify and address degraded components before costlier and labor-intensive degradation conditions progress. In one embodiment, a parameter of the engine or e-turbo may be monitored and compared to a threshold value. In response the monitored parameter differing from the threshold value by at least a threshold amount, a status of the e-turbo may be signaled. The threshold value for the monitored parameter may be a determined value for one or more ambient conditions such as air pressure and/or air temperature (e.g., obtained from a lookup table). In one example, the parameter may be monitored while the motor/generator of the e-turbo is operable to both provide torque to the shaft of the e-turbo and thereby consume electricity provided to the motor, and to retard the shaft and exhaust flow and thereby generate electricity. In one embodiment, the e-turbo or engine parameter may be monitored in a diagnostic mode such as an engine-off condition and the engine connected or disconnected from the compressor discharge and the turbine inlet.

In another embodiment, a diagnostic routine may include monitoring an e-turbo motor speed while the motor/generator of the e-turbo is operated at a commanded power level. In an additional or alternative embodiment, a compressor outlet pressure at an outlet of a compressor of the e-turbo may be monitored while the motor/generator of the e-turbo is operated at a commanded speed. In another embodiment, a crankcase pressure at a crankcase of an engine coupled to the e-turbo may be monitored while the e-turbo is operated at a commanded speed. In response to the monitored e-turbo or engine parameter, e.g., e-turbo motor speed, compressor outlet pressure, crankcase pressure, differing from the determined threshold value by at least the threshold amount, a change in performance status of the e-turbo may be signaled. In some examples, such diagnostic strategies may be used to evaluate for performance anomalies related to foreign objects and/or bearings.

In another embodiment, a diagnostic routine may include obtaining an electrical current signal from a motor/generator of the e-turbo during engine operation. The monitored electrical current signal may be transformed to the frequency domain to form a frequency signal. A status of the e-turbo (e.g., performance change, no change, steady, etc.) may be signaled based on one or more frequency components of the signal. In one embodiment, signaling the status of the e-turbo based on the one or more frequency components of the frequency signal may include identifying a frequency component of interest of the e-turbo, comparing an amplitude of the frequency component of interest to a threshold amplitude, and signaling a change in performance of the e-turbo in response to the amplitude differing from the threshold amplitude by at least a threshold amount. In an embodiment, the one or more frequency components of interest may include a blade pass frequency of the e-turbo. Additionally or alternatively, the frequency component of interest may include a once per revolution frequency of the e-turbo. In another embodiment, the frequency component may include a motor pole frequency of the motor/generator of the e-turbo. In some examples, such diagnostic strategies may be used during vehicle operation (e.g., in real time) to evaluate motor/generator, compressor, and/or turbine performance, to identify potential air gaps, and/or to identify compromised components.

One or more aforementioned diagnostic strategies may be operated, such as one-at-a-time and in succession, to identify and isolate system components that may be contributing to performance changes, trend variances, degradation of performance, and the like. When such performance factors are diagnosed, the system may initiate mitigating actions.

In one example, the e-turbo may be included in an engine system including an internal combustion engine (ICE). The ICE may operate via a combination of different fuels. These fuels may have relatively different amounts of carbon. In one example, the ICE may be a multi-fuel engine that combusts a plurality of fuels. Each of the plurality of fuels may be stored in separate fuel tanks. In one embodiment, one or more of the fuels and its corresponding fuel tank may be housed in a different fuel tank including a different fuel. In one example, a gaseous fuel tank comprising a gaseous fuel may be arranged within an interior volume of a liquid fuel tank comprising a liquid fuel.

The ICE may combust one or more of gasoline, diesel, hydrogenation-derived renewable diesel (HDRD), alcohol (s), ethers, ammonia, biodiesels, hydrogen, natural gas, kerosene, syn-gas, and the like. The plurality of fuels may include gaseous fuels, liquid fuels, and solid fuels, alone or in combination. A substitution rate of a primary fuel of the ICE with a secondary fuel may be determined based on a current engine load. In one embodiment, the substitution rate may correspond to an injection amount of a fuel with a relatively lower carbon content or zero carbon content (e.g., hydrogen gas or ammonia). As the substitution rate increases, the relative proportion of fuel with the lower or zero carbon content increases and the overall amount of carbon content in the combined fuel lowers. Additionally or alternatively, the substitution rate may correspond to an injection amount or delivery of a gaseous fuel relative to a liquid fuel.

Figure 1:
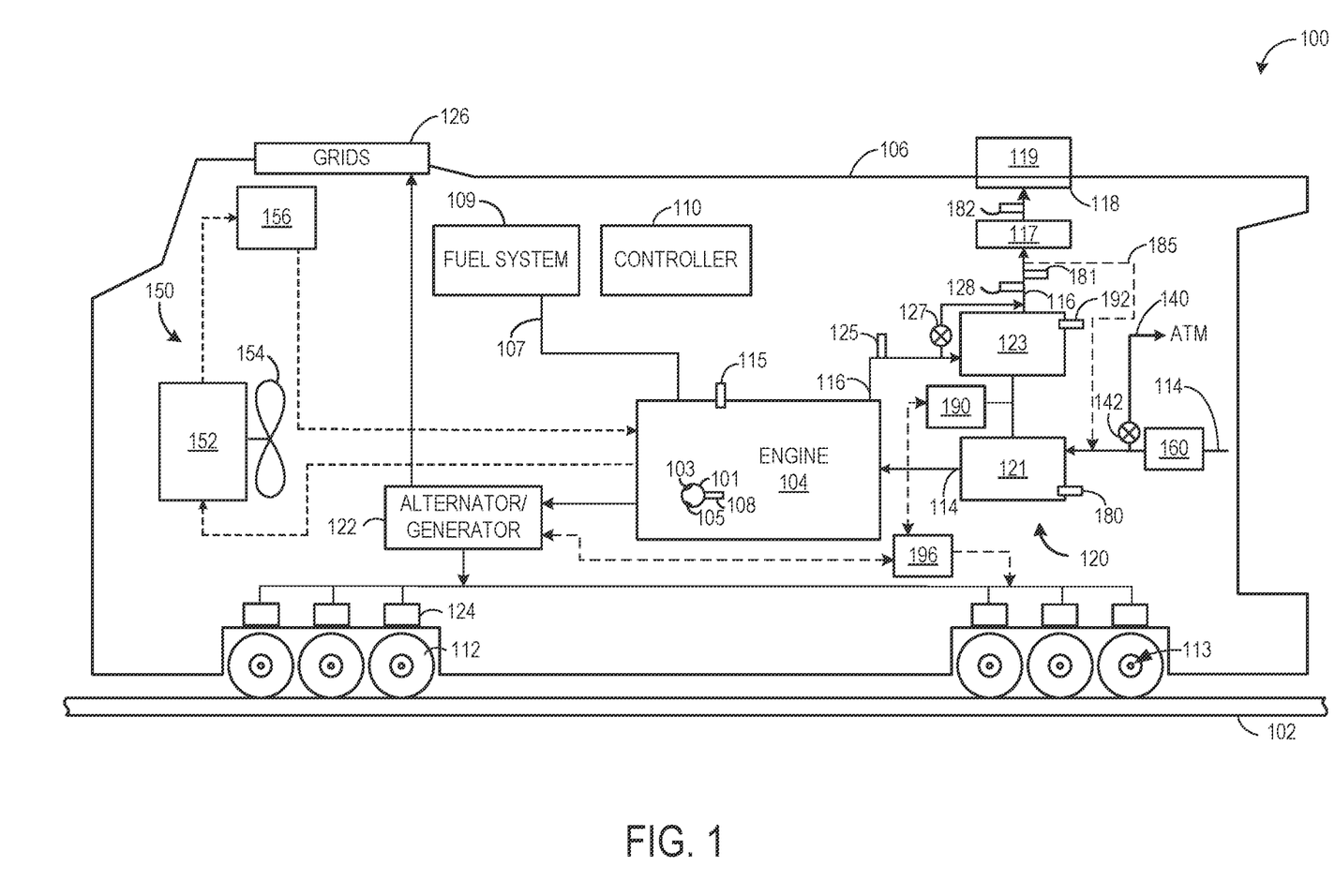
FIG. 1 shows a schematic diagram of a vehicle system with an engine including an e-turbo.

FIG. 1 illustrates an example of a vehicle system that includes an engine, an e-turbo, an aftertreatment system, a fuel system, and a control system. A controller of the vehicle system may use a plurality of different control strategies to carry out diagnostics routines of the e-turbo based on different engine operating conditions and engine performance.

Referring to FIG. 1, a block diagram of an embodiment of a vehicle system 100 having an engine system is shown. The vehicle system includes a vehicle 106. In the illustrated embodiment, the vehicle is a rail vehicle (e.g., a locomotive) that may operate on a rail 102 via a plurality of wheels 112 mounted on axles 113. In another embodiment, the engine system may be disposed in another type of vehicle. Suitable other vehicles may include an automobile, marine vessel, or a truck. Other suitable vehicles may include mining equipment, agricultural equipment, industrial equipment, or other equipment that relies on tractive effort generated by a combination of one or more engines and one or more motors. In another embodiment, the engine is disposed in a stationary system, such as a power generation system.

The illustrated vehicle system includes an engine 104. The engine may include a plurality of cylinders, including the cylinder 101. The plurality of cylinders may each include at least one intake valve 103, at least one exhaust valve 105, and injectors 108. Each fuel injector may include an actuator that may be actuated via a signal from a controller 110 of the engine. The cylinders of the engine may receive fuel from a fuel system 109 via a fuel conduit 107. In some examples, the fuel conduit may be coupled with a common fuel rail and the plurality of injectors. The engine may be spark-ignited or spark-free. In some examples, additionally or alternatively, the engine may combust multiple fuels including at least a first fuel and a second fuel. The first and second fuels may include at least two of gasoline, diesel, hydrogenation-derived renewable diesel (HDRD), alcohol(s), ethers, ammonia, biodiesels, hydrogen, natural gas, kerosene, syn-gas, and the like. The engine may include a crankcase pressure sensor 115 coupled to the crankcase.

During operation, each cylinder within the engine may use a four stroke cycle. The cycle includes the intake stroke, compression stroke, expansion stroke, and exhaust stroke. During the intake stroke, generally, the exhaust valve closes and the intake valve opens. Air is introduced into the combustion chamber via the intake manifold, and the piston moves to the bottom of the cylinder so as to increase the volume within the combustion chamber. The position at which the piston is near the bottom of the cylinder and at the end of its stroke (e.g. when the combustion chamber is at its largest volume) is typically referred to by those of skill in the art as bottom dead center (BDC). During the compression stroke, the intake valve and the exhaust valve are closed. The piston moves toward the cylinder head so as to compress the air within the combustion chamber. The point at which piston is at the end of its stroke and closest to the cylinder head (e.g. when the combustion chamber is at its smallest volume) is typically referred to by those of skill in the art as top dead center (TDC). In a process hereinafter referred to as direct injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push the piston back to BDC. The crankshaft converts piston movement into a rotational torque of the rotary shaft. Finally, during the exhaust stroke, the exhaust valve opens to release the combusted air-fuel mixture to the exhaust manifold and the piston returns to TDC. The intake and exhaust valve opening and/or closing timings may vary, such as to provide positive or negative valve overlap, late intake valve closing, or various other examples. For example, a timing of the opening and/or closing of the intake and/or exhaust valves may be advanced to reduce a temperature of exhaust gases entering an aftertreatment system of the vehicle system, to increase an efficiency of the aftertreatment system. Further, in some examples a two-stroke cycle may be used rather than a four-stroke cycle.

The engine may receive intake air for combustion from an intake passage 114. The intake air includes ambient air from outside of the vehicle flowing into the intake passage through an air filter 160. The intake passage may include and/or be coupled to an intake manifold of the engine. Exhaust gas resulting from combustion in the engine is supplied to an exhaust passage 116 via the exhaust port. Exhaust gas flows through the exhaust passage, to a muffler 118, and out of an exhaust stack 119 of the vehicle.

In one example, the vehicle is a diesel-electric vehicle, where the engine may be coupled to an electric power generation system, including an alternator/generator 122 and electric traction motors 124. The alternator/generator may additionally include a direct current (DC) generator. In other embodiments, suitable engines may use liquid fuel and/or gaseous fuels. A suitable engine may be a diesel engine, a gasoline engine, an alcohol or hydrogen engine, a natural gas engine or a combination of two or more of the foregoing. The engines may be spark ignition or compression ignition type engines. Suitable diesel engines may be regular diesel engines or biodiesel engines. The torque output of the engine may be transmitted to the electric generator or alternator through a mechanical coupling from the engine. As depicted herein, six pairs of traction motors correspond to each of six pairs of motive wheels of the vehicle. In another example, alternator/generator may be coupled to one or more resistive grids 126 or an energy storage device. The resistive grids may dissipate as heat the electricity generated by traction motors in dynamic braking mode. The energy storage device may be used to capture dynamic braking energy, or energy from the generator directly, or energy from any one of a number of selectively couplable sources of electricity (and conversely may pay out energy as may be useful).

The vehicle system may include a turbocharger 120 that may be arranged between the intake passage and the exhaust passage. The turbocharger increases air charge of ambient air drawn into the intake passage in order to provide greater charge density during combustion to increase power output and/or engine-operating efficiency. By adjusting a speed of rotation, the turbocharger can control the volume of exhaust gas passing through the exhaust passage, and the volume of air being passed on to the engine via the intake passage. The turbocharger may include a compressor 121 (disposed in the intake passage) that may be at least partially driven by a turbine 123 (disposed in the exhaust passage). In one embodiment, the turbine may be a fixed geometry turbine. Other suitable turbines may be a variable geometry turbine. The variable vane control may adjust a position of variable geometry turbine vanes, or compressed gas may be flowed through openings in the vanes to modify the laminar flow over the vane, and thus affect the performance of the turbocharger. Exhaust gases may pass through the turbine supplying less energy to rotate the turbine when vanes are in an open position, while exhaust gases may pass through the turbine and impart increased energy on the turbine when vanes are in a closed position. As the turbine rotates, heat and kinetic energy in the exhaust gases may be converted into mechanical energy, which may be used to drive the compressor of the turbocharger to deliver compressed air to the engine intake (e.g., to provide a pressure boost to cylinders of the engine based on engine operating conditions). While a single turbocharger is included in FIG. 1, the system may include multiple turbine and/or compressor stages. The turbine may include a turbine speed sensor 192, and a turbine inlet temperature sensor 125 may be positioned in the exhaust passage, upstream of an inlet of the turbine. The compressor may include a compressor pressure sensor 180 which may measure air pressure at the compressor outlet.

The turbocharger may be an e-turbo, where an electrical machine 190 or motor/generator mechanically coupled to the turbine may convert the mechanical energy into electrical energy. The motor of the e-turbo is operable to both provide torque to a shaft of the e-turbo and thereby to consume electricity provided to the motor, and to retard the shaft and thereby to generate electricity. While operating in a generating mode, extracting the excess exhaust energy may result in improved overall engine efficiency. While operating in a motoring mode, the motor may drive the compressor to provide additional airflow to the engine, which may improve a combustion and/or an emissions of the vehicle. Additionally, the electrical energy may be used to power one or more accessory devices of the vehicle, such as an electric motor, and/or stored in an energy storage device 196 (e.g., a battery, capacitor bank, or electro-chemical converter). In one example, the electric motor powers one or more wheels of the vehicle. The electric motor may direct power the one or more wheels in one embodiment. In other embodiments, the electric motor may transfer power to the energy storage device, and power from the energy storage device may power one or more wheels.

The vehicle system may include a compressor bypass passage 140 coupled directly to the intake passage, upstream of the compressor and upstream of the engine. In one example, the compressor bypass passage may be coupled to the intake passage, upstream of the intake manifold of the engine. The compressor bypass passage may divert airflow (e.g., from before the compressor inlet) away from the engine (or intake manifold of the engine) and to atmosphere. A compressor bypass valve (CBV) 142 may be positioned in the compressor bypass passage and may include an actuator that may be controlled by the controller to adjust the amount of intake airflow diverted away from the engine and to atmosphere. In addition, an engine bypass passage (not shown) may couple the intake passage, upstream of the compressor, to the exhaust passage, upstream of the turbine to directly route air from the intake passage to the turbine during a diagnostic routine, bypassing the engine.

Additionally, a wastegate 127 may be disposed in a bypass passage around the turbine, which may be adjusted, via actuation from the controller, to increase or decrease exhaust gas flow through the turbine. For example, opening the wastegate (or increasing the amount of opening) may decrease exhaust flow through the turbine and correspondingly decrease the rotational speed of the compressor. As a result, less air may enter the engine, thereby decreasing the combustion air-fuel ratio.

The vehicle system may include a cooling system 150 (e.g., an engine cooling system). The cooling system may circulate coolant through the engine to absorb waste engine heat to distribute to a heat exchanger, such as a radiator 152 (e.g., a radiator heat exchanger). In one example, the coolant may be water, anti-freeze, or a mixture of the two. In another example, the coolant may be oil. A fan 154 may be coupled to the radiator to maintain an airflow through the radiator when the vehicle is moving slowly or stopped while the engine is running. In some examples, a fan speed may be controlled by a fan controller. Coolant that is cooled by the radiator may enter a tank (not shown in FIG. 1). The coolant may then be pumped by a pump 156 back to the engine or to another component of the vehicle system.

The vehicle system may include an aftertreatment system 117 coupled in the exhaust passage downstream of the turbocharger. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, NOx trap, or various other devices or systems. In one example, an aftertreatment temperature sensor 128 is arranged at or upstream of an inlet of the aftertreatment system, which may measure a temperature of exhaust gas prior to entering the aftertreatment system. Additionally, one or more AFR sensors or oxygen ($O_2$) sensors may be arranged on an exhaust conduit upstream and/or downstream of the aftertreatment system. For example, an AFR sensor or $O_2$ sensor 181 may be arranged at the inlet of the aftertreatment system, which may estimate an AFR of the engine from the exhaust gas prior to entering the aftertreatment system, or an AFR sensor or $O_2$ sensor 182 may be arranged downstream of the aftertreatment system (e.g., at an exhaust pipe), which may estimate the AFR from exhaust gas exiting the aftertreatment system.

The vehicle system may include an exhaust gas recirculation (EGR) system 185 coupled to the engine. The EGR system may route exhaust gas from the exhaust passage of the engine to the intake passage downstream of the turbocharger. In some embodiments, the exhaust gas recirculation system may be coupled exclusively to a group of one or more donor cylinders of the engine (also referred to as a donor cylinder system).

The controller may control various components and operations related to the vehicle. As an example, various components of the vehicle system may be coupled to the controller via a communication channel or data bus. In one example, the controller includes a computer control system. The controller may additionally or alternatively include a memory holding non-transitory computer readable storage media (not shown) including code for enabling on-board monitoring and control of vehicle operation. In some examples, the controller may include more than one controller each in communication with one another, such as a first controller to control the engine and a second controller to control other operating parameters of the vehicle (such as engine load, engine speed, brake torque, etc.). The first controller may control various actuators based on output received from the second controller and/or the second controller may control various actuators based on output received from the first controller.

The controller may receive information from a plurality of sensors and may send control signals to a plurality of actuators. The controller, while overseeing control and management of the vehicle, may receive signals from a variety of engine sensors. The signals may be used to determine operating parameters and operating conditions, and correspondingly adjust various engine actuators to control operation of the vehicle. For example, the engine controller may receive signals from various engine sensors including, but not limited to, engine speed, engine load (derived from fueling quantity commanded by the engine controller, turbocharger speed, fueling quantity indicated by measured fuel system parameters, averaged mean-torque data, manifold pressure, and/or electric power output from the alternator or generator), mass airflow amount/rate (e.g., via a mass airflow meter), intake manifold air pressure, boost pressure, exhaust pressure, ambient pressure, ambient temperature, crankcase pressure, exhaust temperature (such as the exhaust temperature entering the turbine, as determined from the turbine inlet temperature sensor, compressor inlet pressure, or the exhaust temperature entering the aftertreatment system, as determined from the inlet temperature sensor), particulate filter temperature, particulate filter back pressure, engine coolant pressure, exhaust oxides-of-nitrogen quantity (from NOx sensor), exhaust soot quantity (from soot/particulate matter sensor), exhaust gas oxygen level sensor, or the like. Correspondingly, the controller may control the vehicle by sending commands to various components such as the traction motors, the alternator/generator, cylinder valves, fuel injectors, a notch throttle, the compressor bypass valve (or an engine bypass valve in alternate embodiments), the wastegate, or the like. Other actively operating and controlling actuators may be coupled to various locations in the vehicle.

As one example, the controller may obtain an e-turbo parameter of the e-turbo or an engine parameter of the engine operably coupled to the e-turbo. The controller may compare the e-turbo parameter or the engine parameter to a determined threshold value for the e-turbo parameter or the engine parameter. The controller may signal a status of the e-turbo in response to the comparison. For example, if the e-turbo parameter or engine parameter differ from the determined threshold value by at least a threshold amount, then degradation may be determined. In one embodiment, the status may be a performance status such as indicating a change in performance or alternatively indicating no change (e.g., steady, expected, baseline) in performance. In another embodiment, the e-turbo or engine parameter may include a motor speed of the electric motor (e.g., motor/generator) of the e-turbo, a compressor outlet pressure of a compressor of the e-turbo, or a crankcase pressure of the engine. When the e-turbo parameter or the engine parameter is obtained, a turbine inlet of the e-turbo may be disconnected from the engine and the compressor outlet of the compressor of the e-turbo may be disconnected from the engine. Additionally or alternatively, when the e-turbo or engine parameter is obtained, the motor of the e-turbo may be operated at a commanded power level or at a commanded speed. In another embodiment, the controller may monitor a frequency component of a frequency signal of electric current of a motor of the e-turbo. The monitored frequency component may be compared to an amplitude of the frequency component of a threshold amplitude. As one example a fast Fourier transform (FFT) analysis of the electrical current signal may be carried out. A performance status of the e-turbo may be signaled based on one of the aforementioned controller configurations.

Figure 2:
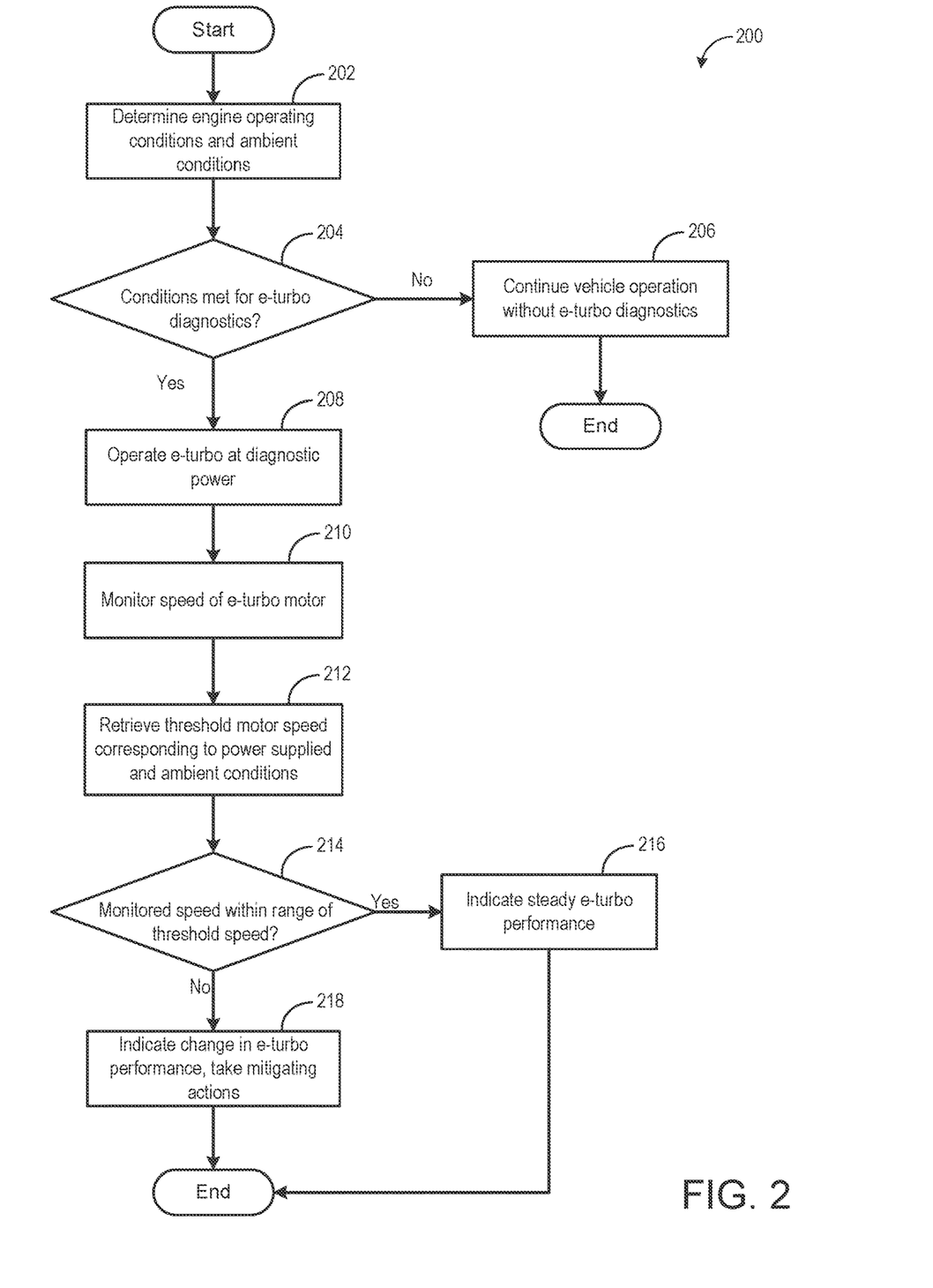
FIG. 2 shows a first example method for carrying out a first diagnostics routine of the e-turbo of the engine.

Turning now to FIG. 2, it shows a flow chart illustrating a first method 200 for carrying out a first diagnostic routine of an electric turbocharger (such as the e-turbo shown in FIG. 1) of the engine. Instructions for carrying out the method and the other methods included herein may be executed by a controller having one or more processors. The execution may be based at least in part on instructions stored on a memory of the controller and in conjunction with signals received from sensors of the engine system, such as the sensors described above with reference to FIG. 1. The controller may employ engine actuators of the engine system to adjust engine operation, according to the methods described below. Adjusting engine operation may include switching from one engine operating mode to another engine operating mode.

At step 202, the method may include determining (e.g., obtaining and/or estimating) engine operating conditions and ambient conditions. Engine operating conditions may include, but are not limited to, one or more of an engine status (e.g., on or off), a turbo speed, a compressor pressure, an engine speed, an engine temperature, an engine power, a manifold pressure, and an exhaust gas temperature. Ambient conditions may include ambient temperature, pressure, and humidity.

At step 204, the method may include determining if conditions are met for diagnostics of the e-turbo using the first diagnostic routine. The conditions for the first diagnostic routine may include the engine being off and engine torque not being used for propelling the vehicle. In some embodiments, the conditions for the first diagnostic routine may include the e-turbo being disconnected from the engine. In some embodiments, additionally or alternatively, the conditions for the first diagnostic routine may include the e-turbo being connected to the engine and the engine in a diagnostic mode. The diagnostic mode may include where intake and/or exhaust valves are positioned for air flow through the engine (e.g., open and spaced away from corresponding valve seats). The conditions for the first diagnostic routine may further include a change in engine performance during immediately previous engine operation prior to the engine being turned off. For example, the change may include a lower than expected engine speed and/or engine output for a torque demand. The controller may use a look-up table to determine an expected engine output based on a present torque demand. The conditions for the first diagnostic routine may further include a change in e-turbo performance such as a change from steady compressor output during the immediately previous engine operation. In one example, upon detection of a change in engine or e-turbo performance, a visual inspection of the e-turbo system may be carried out by a technician to ensure that are no structural degradations, such as a crack or other deformation that may result in a leak.

If it is determined that the conditions are not met, at step 206, the method may include continuing vehicle operation without carrying out the first diagnostic routine for the e-turbo. During engine operation, real time diagnostics of the e-turbo may be carried out via a fourth diagnostic routine, as elaborated in FIG. 5.

If it is determined that conditions are met for the first diagnostic routine to be carried out, at step 208, the method may include operating the e-turbo at a diagnostic power. The diagnostic power may be a pre-calibrated, commanded power level of the motor of the e-turbo based on e-turbo characteristics such as a geometry of the e-turbo. A current may be supplied to the motor of the e-turbo to operate the turbine at the diagnostic power, and the current may be supplied at an amount based on a look-up table or other function that map current to motor power. The motor may be supplied with the current amount without regard for the actual speed of the motor (e.g., motor speed feedback may be ignored). In one example, as the e-turbo is operated, the ambient air may be drawn in through the engine and routed out through the exhaust. In another example, a bypass line connecting the intake passage to the exhaust passage may be opened and the ambient air is directly routed from the intake passage to the exhaust passage without flowing through the engine. In a still further example, the e-turbo may be disconnected from the engine and ambient air may be drawn into the turbine inlet (e.g., from atmosphere) and released to atmosphere via the turbine outlet, and ambient air may be drawn into the compressor inlet (e.g., from atmosphere) and released to atmosphere via the compressor outlet.

At step 210, the method may include monitoring a speed of the motor of the e-turbo as the e-turbo is operated at the diagnostic power. The speed of the motor may be determined based on output from a speed sensor coupled to the motor. At step 212, the routine may include retrieving a threshold motor speed corresponding to one or more of the power supplied to the e-turbo, diagnostic conditions (e.g., e-turbo to engine connection), the lubricant supply conditions, and the current ambient conditions. The lubricant supply conditions may include one or more of a lubricant temperature, a lubricant viscosity, lubricant age, and other lubricant conditions that may impact the speed of the motor. A look-up table, stored in memory, may be pre-populated with threshold motor speeds corresponding to a plurality of turbine power and ambient conditions and the controller may retrieve the threshold motor speed from the look-up table. Ambient conditions such as temperature and air density (influenced by altitude) may affect e-turbo operating parameters including motor speed.

At step 214, the method may include determining if the monitored motor speed is within a range of the threshold motor speed (e.g., within 5% or within 10%) as retrieved in step 212. If the monitored motor speed and the threshold motor speed are within range, it may be indicated at step 216 that the e-turbo performance is steady and the diagnostic is passed. However, if it is determined that the monitored motor speed is not within range of the threshold motor speed, for example if the monitored/measured motor speed is outside the range of the threshold motor speed (e.g., different than the threshold motor speed by a determined amount and outside the boundaries of the range), then at step 218, the routing may include indicating a change in performance of the e-turbo, and a flag (diagnostic code) may be raised. As such, the diagnostic is failed (e.g., not passed). As one example, a lower motor speed may indicate foreign object having degraded the e-turbo or bearing degradation of the motor. To mitigate a performance change indication, the e-turbo may be inspected and serviced by a technician. In some examples, one or more additional diagnostic routines may be executed in response to the monitored motor speed being out of range such as a second method described below for determining compressor performance. For example, the determination that the motor speed is different than the threshold motor speed may indicate a change in performance of the e-turbo, and one or more of the additional diagnostics routines may be executed to facilitate identification of a component of the e-turbo that is exhibiting the change in performance. In one example, additionally or alternatively, the e-turbo may no longer power one or more wheels of the vehicle following not passing the first diagnostic routine.

Figure 3:
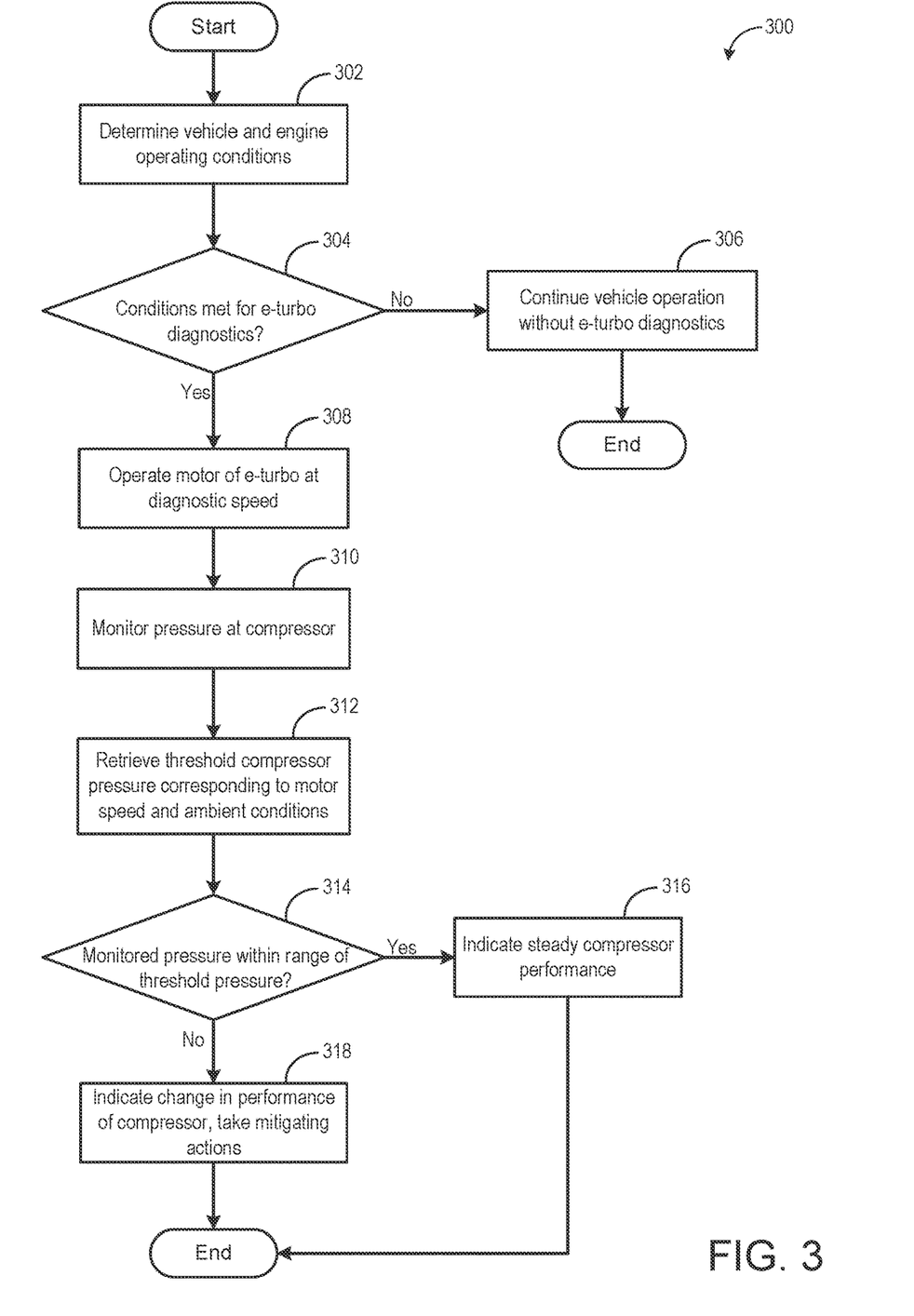
FIG. 3 shows a second example method for carrying out a second diagnostics routine of the e-turbo of the engine.

FIG. 3 shows a flow chart illustrating a second method 300 for carrying out a second diagnostic routine of an electric turbocharger (such as the e-turbo shown in FIG. 1) of the engine. At step 302, the method may include determining engine operating conditions and ambient conditions. Engine operating conditions may include, one or more of, but are not limited to an engine status (e.g., on or off), a turbo speed, a compressor pressure, an engine speed, an engine temperature, an engine power, a manifold pressure, and an exhaust gas temperature. Ambient conditions may include ambient temperature, pressure, and humidity.

At step 304, the method may include determining if conditions are met for diagnostics of the e-turbo using the second diagnostic routine. The conditions for the second diagnostic routine may include the engine being off and engine torque not being used for propelling the vehicle. In some examples, the conditions for the second diagnostic routine may include the e-turbo being disconnected from the engine. In another embodiment, the conditions for the second diagnostic routine may include the e-turbo being connected to the engine and the engine operated in the diagnostic mode, as explained above with respect to FIG. 2. The conditions for the second diagnostic routine may further include a change in engine performance during the immediately previous engine operation prior to be shut-off. The change may include a lower than expected engine speed and engine output for a torque demand. The controller may use a look-up table to determine expected engine output corresponding to a torque demand. The conditions may further include a change in e-turbo performance such as a change from steady compressor output during the immediately previous engine on condition. In one example, upon detection of a change in engine or e-turbo performance, a visual inspection of the e-turbo system may be carried out by a technician to determine a structural degradation is not present.

If it is determined that the conditions are not met, at step 306, the method may include continuing vehicle operation without carrying out the second diagnostic routine for the e-turbo. During engine operation, real time diagnostics of the e-turbo may be carried out via the fourth diagnostic routine, as elaborated in FIG. 5.

If it is determined that conditions are met for the second diagnostic routine, then at step 308, the method may include operating the motor of the e-turbo at a diagnostic speed. The diagnostic speed may be pre-calibrated, commanded speed based on the characteristics such as geometry of the e-turbo and the motor and may be adjusted based on ambient temperature. The diagnostic speed may be identical to the diagnostic power, in one example, such that a power output of the e-turbo operated at the diagnostic speed is equal to the diagnostic power. In some examples, additionally or alternatively, the diagnostic speed may generate a power output of the e-turbo being different than the diagnostic power. A current may be supplied to the motor of the e-turbo from an on-board battery or other source to operate the motor at the diagnostic speed. Feedback from a motor speed sensor may be used to control the current provided to the motor to ensure the diagnostic speed is reached. In one example, as the e-turbo is operated, the ambient air may be drawn in through the engine and routed out through the exhaust. In another example, a bypass line connecting the intake passage to the exhaust passage may be opened and the ambient air is directly routed form the intake passage to the exhaust passage without flowing through the engine. In a still further example, the e-turbo may be disconnected from the engine and ambient air may be drawn into the turbine inlet (e.g., from atmosphere) and released to atmosphere via the turbine outlet, and ambient air may be drawn into the compressor inlet (e.g., from atmosphere) and released to atmosphere via the compressor outlet.

At step 310, the method may include monitoring a pressure at the outlet of the compressor of the e-turbo. In one example, the pressure may be monitored via a pressure sensor (such as the pressure sensor shown in FIG. 1) coupled to the compressor. At step 312, the controller may retrieve a threshold compressor pressure corresponding to the operating speed of the motor and the current ambient conditions. A look-up table may be pre-populated with threshold compressor pressures corresponding to a plurality of motor speeds, diagnostic and ambient conditions, and the controller may use the look-up table to determine the threshold compressor pressure. Ambient conditions such as temperature and air density may affect e-turbo operating parameters including compressor pressure.

At step 314, the routine may include determining if the monitored pressure at the compressor outlet is within range of the threshold pressure (e.g., within 5%) as retrieved in step 312. If the monitored pressure at the compressor outlet is within a determined range of the threshold pressure, it may be indicated at step 316 that the performance of the compressor is steady and the second diagnostic routine is passed. In one embodiment, one or more additional diagnostic routines may be executed in response to the second diagnostic routine being passed, such as a third method described below for determining crankcase performance.

If it is determined that the monitored compressor outlet pressure is not within range of the threshold pressure, for example if the measured compressor outlet pressure differs from the threshold pressure by more than a determined amount (e.g., 3%, or 5%, or 10%), then at step 318, the method may include indicating a change in compressor performance, and mitigating actions may be executed. For example, a flag and diagnostic code may be assigned. A request for the e-turbo to be inspected and serviced by a technician may be sent to the vehicle operator via text, email, vehicle display device, phone call, and the like. The mitigating actions may further include where the e-turbo is operated in a different manner than prior to the flag, for example, to reduce the chance of component degradation or further exasperation of a present degradation, to ensure that a vehicle does not attempt an action that is no longer supportable by the efforts of the engine coupled to the e-turbo, to maintain emissions outputs within determined compliance limits, and/or to ensure that the engine (and associated vehicle) is capable of completing its current travel plan. In one example, additionally or alternatively, the e-turbo may no longer power one or more wheels of the vehicle following not passing the second diagnostic routine.

Figure 4:
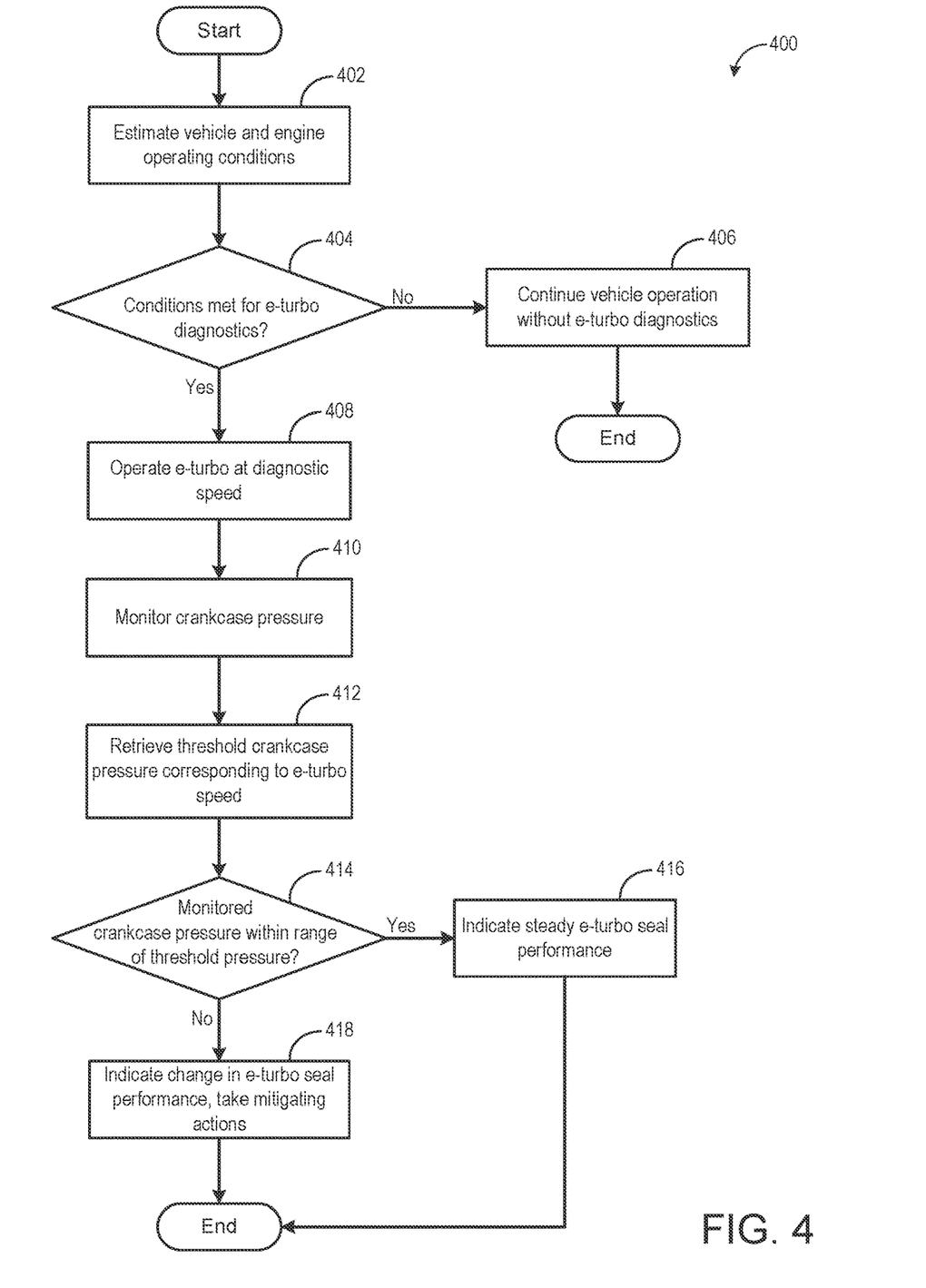
FIG. 4 shows a third example method for carrying out a third diagnostics routine of the e-turbo of the engine.

FIG. 4 shows a flow chart illustrating the third method 400 for carrying out a third diagnostic routine of an electric turbocharger (such as the e-turbo in FIG. 1) of the engine. At step 402, the method may include estimating engine operating conditions and ambient conditions. Engine operating conditions may include, but are not limited to, one or more of an engine status (e.g., on or off), a turbo speed, a compressor pressure, an engine speed, an engine temperature, an engine power, a manifold pressure, and an exhaust gas temperature. Ambient conditions may include ambient temperature, pressure, and humidity.

At step 404, the routine may include determining if conditions are met for diagnostics of the e-turbo using the third diagnostic routine. The conditions may include the engine being off and engine torque not being used for propelling the vehicle. In some examples, the conditions for the third diagnostic routine may include the e-turbo being disconnected from the engine (e.g., the turbine inlet and/or compressor outlet being disconnected from the engine). In some examples, the condition for the third diagnostic routine may include the e-turbo being connected to the engine and the engine being in the diagnostic mode. The conditions for the third diagnostic routine may further include detecting an increase in crankcase pressure exceeding a determined crankcase pressure limit for a given load during the immediately previous engine operation prior to shut-off The conditions for the third diagnostic routine may further include a change in engine performance during the immediately previous engine operation prior to being shut-off, wherein the change includes a lower than expected engine speed and engine output for a torque demand. The controller may use a look-up table to determine an expected engine output corresponding to the torque demand. The conditions for the third diagnostic routine may further include a change in e-turbo performance such as a lower than expected compressor speed or power output during the immediately previous engine operation. In one example, upon detection of a change of engine performance or e-turbo performance, a visual inspection of the e-turbo system may be carried out by a technician to determine if structural degradation is present.

If it is determined that the conditions are not met, at step 406, vehicle operation may be continued without carrying out the third diagnostic routine for the e-turbo. During engine operation, real time diagnostics of the e-turbo may be carried out via the fourth diagnostic routine, as elaborated in FIG. 5.

If it is determined that conditions are met for the third diagnostic routine, then at step 408, the method may include operating a turbine of the e-turbo at a diagnostic speed. The diagnostic speed may be a pre-calibrated, commanded speed based on the characteristics such as geometry of the e-turbo, and may be achieved according to the motor speed feedback described above with respect to FIG. 2. In one example, the diagnostic speed of the third diagnostic routine may be equal to the diagnostic speed of the second diagnostic routine. Additionally or alternatively, the diagnostic speed of the second diagnostic routine may be a first diagnostic speed and the diagnostic speed of the third diagnostic routine may be a second diagnostic speed different than the first diagnostic speed. In another example, additionally or alternatively, the e-turbo may be operated a diagnostic power. The diagnostic power of the third diagnostic routine may be equal to or different than the diagnostic power of the first diagnostic routine. A current may be supplied to the motor of the e-turbo to operate the turbine at the diagnostic speed. In one example, as the e-turbo is operated, the ambient air may be drawn in through the engine and routed out through the exhaust. In another example, a bypass line connecting the intake passage to the exhaust passage may be opened and the ambient air is directly routed from the intake passage to the exhaust passage without flowing through the engine.

At step 410, the method may include monitoring crankcase pressure. In one example, the crankcase pressure may be monitored via a pressure sensor coupled to the crankcase of the engine (e.g., the pressure sensor described in FIG. 1). At step 412, the method may include retrieving, via the controller, a threshold crankcase pressure corresponding to the diagnostic speed supplied to the turbine and other diagnostic conditions and the current ambient conditions. A look-up table may be pre-populated with desired crankcase pressures corresponding to a plurality of e-turbo speeds and ambient conditions and the controller may use the look-up table to determine the threshold compressor pressure. Ambient conditions such as temperature and air density may affect e-turbo operating parameters including compressor pressure.

At step 414, the method may include determining if the monitored crankcase pressure is within range of the threshold pressure (e.g., within 5% or within 10%) as retrieved in step 412. In some examples of e-turbo performance change, the crankcase pressure may be higher than a threshold crankcase pressure for the current conditions. If the monitored crankcase pressure is within a determined range of the threshold crankcase pressure, it may be indicated at step 416 that the e-turbo shaft seal performance is steady. The third diagnostic routine is passed. However, if it is determined that the monitored crankcase pressure is not within the determined range of the threshold pressure, then at step 418, the method may include indicating a change in e-turbo shaft seal performance and mitigating actions may be executed. In one example, a flag (diagnostic code) may be activated. In order to mitigate degradation, a request for the e-turbo to be inspected and serviced by a technician may be sent to the vehicle operator. One or more of the first, second, and third diagnostics routine may be carried out successively upon conditions being met during an engine off condition to determine robustness of the e-turbo. In one example, additionally or alternatively, the e-turbo may no longer power one or more wheels of the vehicle following not passing the third diagnostic routine.

In one embodiment, with the engine in an off condition, the e-turbo may be driven to a pre-calibrated boost level. A visual and/or audible walk around may be carried out by a technician to check the charge air system for leaks. As one example, soapy water may be used to inspect for charge air leaks. Such a diagnostic routine may enable a charge air check walk around without the engine running. The soapy water may be applied to the e-turbo, the engine, the crankcase, the EGR system, and other systems that receive charge air.

Figure 5:
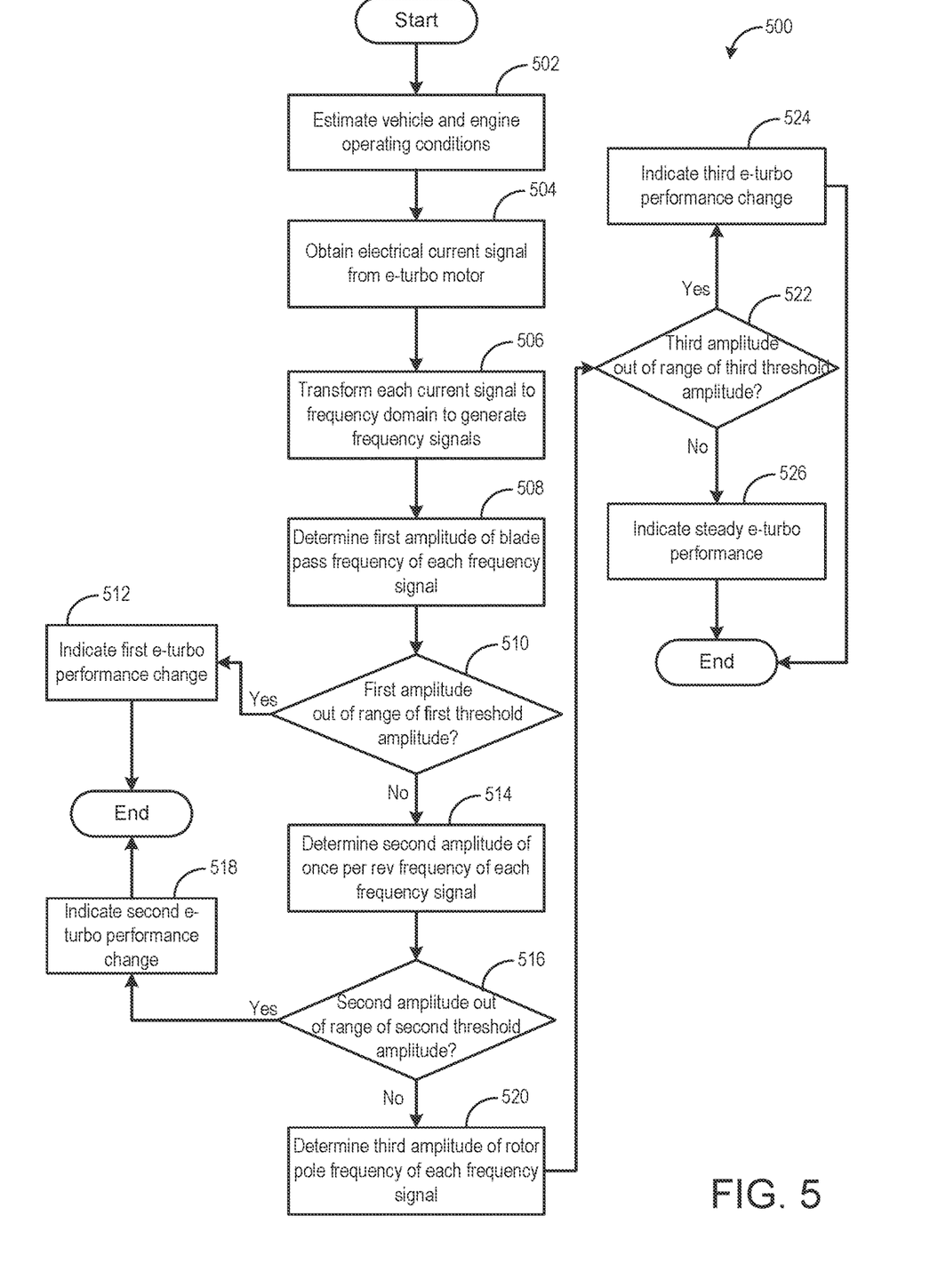
FIG. 5 shows a fourth example method for carrying out a fourth diagnostics routine of the e-turbo of the engine.

FIG. 5 shows a flow chart illustrating a fourth method 500 for carrying out a fourth diagnostic routine of an electric turbocharger (such as the e-turbo in FIG. 1) of the engine. The fourth diagnostic routine may be carried out in real-time during engine operation with the e-turbo being operated to provide boost pressure or as a generator to power at least one wheel, power an auxiliary system, or charge an energy storage device coupled to the motor of the e-turbo. In contrast, the second, third, and fourth diagnostic routines, as described in FIGS. 2-4, may be carried out during engine-off conditions.

At step 502, the method may include estimating engine operating conditions and ambient conditions. Engine operating conditions may include a turbo speed, a compressor pressure, an engine speed, an engine temperature, an engine power, a manifold pressure, and an exhaust gas temperature. Ambient conditions may include ambient temperature, pressure, and humidity.

At step 504, the method may include obtaining an electrical current signal (one or more phase AC) from the motor powering the e-turbo. Because the electric current may include multiple phases, multiple electrical current signals may be obtained, each corresponding to a respective phase (each phase offset in angle to the other).

At step 506, the method may include transforming each current signal to the frequency domain to generate frequency signals. In one example, fast Fourier transform (FFT) may be carried out on the electrical current signals to transform the signals to the frequency domain, though other transformations may be applied to determine the frequency components of the electrical current signals. In some examples, input frequencies such as 60 Hz electrical signal may be filtered out of the frequency signals. The frequency domain may illustrate how each current signal is distributed over a range of frequencies by converting the signal between time and frequency domains using the FFT or other transforms.

At step 508, the method may include determining a first amplitude of a blade pass frequency of each frequency signal. The blade pass frequency for the turbine and the compressor of the e-turbo may be based on the number of blades in the turbine and/or the compressor and the current speed of the motor of the e-turbo. In some examples, the blade pass frequency for the turbine may be different than the blade pass frequency for the compressor, and thus two different blade pass frequencies may be analyzed.

At step 510, the method may include determining if the first amplitude of the blade pass frequency is out of range a first threshold amplitude. The first amplitude may be evaluated for each frequency signal, and if one or more or each first amplitude is out of range of the first threshold amplitude, then it may be determined that overall, the first amplitude is out of range. If it is determined that the first amplitude is out of range, the method may proceed to step 512 to indicate a first e-turbo performance change. As one example, a notification may be displayed and/or a diagnostic code may be stored indicating the performance change. As one example, the first e-turbo performance change may indicate one or more blades may be missing and mitigating actions may be taken. Mitigation may include dismantling, inspection, and repair of the e-turbo blades by a technician. As such, the fourth diagnostic routine is not passed (e.g., failed). In one example, in response to not passing the fourth diagnostic routine, e-turbo operation may be adjusted. For example, the e-turbo may no longer power at least one wheel of the vehicle in response to the fourth diagnostic routine being failed.

If the first amplitude is not out of range of the first threshold amplitude, at step 514, the method may include determining a second amplitude of a once per revolution frequency of each frequency signal. In some examples, the once per revolution frequency may be analyzed to monitor an air gap as the poles rotate around the machine. In presence of non-uniform gaps, the signal may be higher at the closer gaps and lower at the larger gaps. The poles may be a characteristic of the motor of the e-turbo, such as a number of poles in a winding of the motor.

At step 516, the routine may include determining if the second amplitude is out of range of the second threshold amplitude.

If it is determined that the second amplitude is out of range, the method may proceed to step 518 which includes indicating a second e-turbo performance change. As one example, a notification may be displayed and/or a diagnostic code may be stored indicating the performance change. The fourth diagnostic routine is failed. As one example, a second performance change may indicate bearing degradation or air gap changes resulting from rotor imbalance and mitigating actions may be taken. The mitigation may include dismantling, inspection, and repair of the e-turbo by a technician. Additionally or alternatively, the mitigating actions may include no longer powering at least one wheel of the vehicle in response to fourth diagnostic routine being failed.

If the second amplitude of once per revolution frequency of each frequency signal is found within range of the second threshold, at step 520, the method may include determining a third amplitude of rotor pole frequency of each frequency signal. At step 522, the method may include determining if the third amplitude is out of range of a third amplitude threshold.

If it is determined that the third amplitude is out of range of the third amplitude threshold, the routine may include indicating a third e-turbo performance change at step 524. The fourth diagnostic routine is failed. As one example, a notification may be displayed and/or a diagnostic code may be stored indicating the performance change. In one example, the third e-turbo performance change to indicate that motor may be damaged and suitable mitigating actions may to be taken. The mitigation may include dismantling, inspection, and repair of the e-turbo motor by a technician. In one example, the e-turbo may not be used to power at least one wheel of the vehicle in response to the fourth diagnostic routine being failed.

If it is determined that the third amplitude is in range, the method may indicate steady e-turbo performance at step 526. In one example, the fourth diagnostic routine is passed and mitigating actions are not executed.

In this way, a multitude of diagnostics may be executed to determine a condition of the e-turbo. Adjustments to operating parameters may be executed in response to one or more of the diagnostics being failed to mitigate further degradation to the e-turbo and/or the engine. For example, a turbocharger speed may be limited following failing one or more of the first through fourth diagnostics. By doing this, a rate of degradation may be reduced or maintained. Limiting the turbocharger speed may further include one or more of reducing engine power, opening a wastegate, opening turbine vanes, and opening a charge air blow-off valve (e.g., a compressor bypass). The turbocharger speed limit may be determined via the third diagnostic routine based on a determined increase in shaft motion or a difference between a determined limit and measured values. In another example, additionally or alternatively, if e-turbo seal performance is degraded and crankcase pressure is higher than the determined crankcase pressure, then crankcase pressure shutdown thresholds may be modified or waived. The crankcase pressure shutdown thresholds may include limiting the turbocharger speed as described above. Additionally or alternatively, engine operation may be unadjusted in response to the high crankcase pressure due to the turbocharger degradation impacting the crankcase. As such, the engine may be used to complete a remainder of a journey by waiving the crankcase pressure shutdown thresholds or modifying its parameters to maintain an engine power output above a lower determined limit. If multiple diagnostic routines are failed, then it may be determined that a false positive is not present and the presence of a degradation is verified. In some examples, additionally or alternatively, combinations of multiple diagnostic routines being failed may indicate a specific failure. For example, if the first, third, and fourth routines are failed and the second routine is passed, then a bearing degradation may be present. If the first, second, and fourth routines are failed and the third routine is passed, then an aerodynamic component degradation may be present.

In one example, on the fourth diagnostic routine may include an assumption that the e-turbo only exhibits one type of performance change during a diagnosis of the first, second, and third changes. In some examples, each signal frequency analysis may be performed regardless of whether the first, second, or third change in performance is indicated. In other words, if the first (or other) performance change is indicated, the routine may include determining if the second and/or third amplitude is out of range. In this way, different degradations may be determined and corrective measures requested.

In some examples, the electric current of the motor may have a waveform that is analyzed for deviations from a threshold waveform. The threshold waveform may be a waveform of a normally operating e-turbo (e.g., an e-turbo that passes each of the first, second, third, and fourth diagnostics). For example, the waveform of the electric current may be compared to the waveform of the normally operating e-turbo and any deviations, or certain types of deviations, between the two waveforms may be indicative of a change in performance of the e-turbo. In some examples, the waveform in the time domain may be analyzed. In some examples, the waveform in the frequency domain may be analyzed, as explained above. Deviations may occur due to one or more of a phase-earth fault, a wire fraying or becoming loose, an imbalanced load, and a power system degradation.

Figure 6:
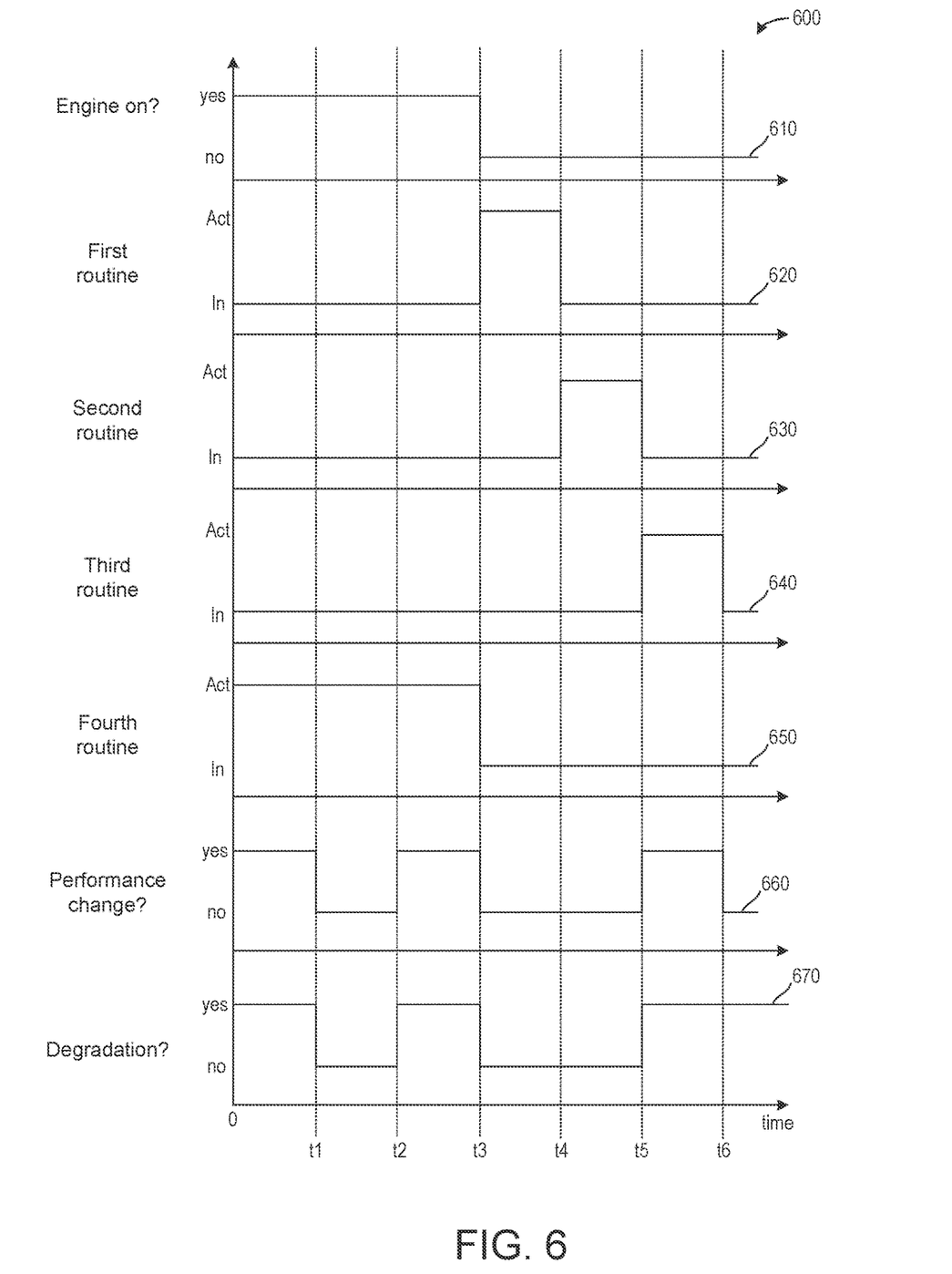
FIG. 6 shows a graph illustrating an operating sequence of the system of FIG. 1 executing the methods of FIGS. 2-5.

Turning now to FIG. 6, it shows an operating sequence illustrating a graph 600 showing the diagnostic routines being executed based on the combination of the system of FIG. 1 with the methods of FIGS. 2-5. Plot 610 illustrates if an engine is on. Plot 620 illustrates if a first diagnostic routine is active. Plot 630 illustrates if a second diagnostic routine is active. Plot 640 illustrates if a third diagnostic routine is active. Plot 650 illustrates if a fourth diagnostic routine is active. Plot 660 illustrates if a performance change is detected. Plot 670 illustrates if a degradation is present. Time increases from a left to a right side of the figure.

Prior to t1, the engine is on and the fourth diagnostic routine is being executed. In one example, the first amplitude is compared to the first amplitude threshold. A performance change is detected and thus, a degradation is indicated due to the first amplitude being out of a determined range of the first amplitude threshold.

At t1, the fourth diagnostic routine begins to monitor the second amplitude. Between t1 and t2, the second amplitude is compared to the second amplitude threshold. In one example, the second amplitude threshold is different than the first amplitude threshold. The second amplitude is within a determined range of the second amplitude threshold. As such, a performance change is not detected and a degradation is not indicated based on the second amplitude comparison.

At t2, the fourth diagnostic routine begins to monitor the third amplitude. Between t2 and t3, the third amplitude is compared to the third amplitude threshold. In one example, the third amplitude threshold is different than the first amplitude threshold and/or the second amplitude threshold. The third amplitude is outside of a determined range of the third amplitude threshold. As such, a performance change is detected and a degradation is indicated based on the third amplitude comparison.

At t3, the engine is shut-off. The first diagnostic routine is activated. Between t3 and t4, the e-turbo is operated at a diagnostic power and a monitored speed of the e-turbo is compared to a threshold e-turbo speed. The monitored speed is within a determined range of the threshold e-turbo speed and a performance change is not determined and a degradation is not indicated. The first diagnostic routine is passed.

At t4, the engine remains shut-off and the second diagnostic routine is activated. Between t4 and t5, the e-turbo is operated at a diagnostic speed and a monitored compressor outlet pressure is compared to a threshold pressure. The monitored compressor outlet pressure is within a determined range of the threshold pressure and a performance change is not determined. Degradation is not indicated. The second diagnostic routine is passed.

At t5, the engine remains shut-off and the third diagnostic routine is activated. Between t5 and t6, the e-turbo is operated at a diagnostic speed and a monitored crankcase pressure is compared to a threshold crankcase pressure. The monitored crankcase pressure is outside of a determined range of the threshold crankcase pressure and a performance change is determined. Degradation is indicated. The third diagnostic routine is not passed (e.g., failed). At t6, the third diagnostic routine is inactive.

After t6, diagnostic routines are no longer executed. Degradation of the e-turbo and crankcase remains active and indicated (e.g., via a flag) based on the results of the fourth routine amplitude checks and the third diagnostic routine. By executing these diagnostic routines independent of their results, multiple degradations may be identified, which may reduce maintenance costs and improve customer satisfaction.

The technical effect of diagnosing the e-turbo during engine operation and during engine off conditions is that any degradations of the e-turbo may be identified and addressed without having to dismantle the e-turbo. Additionally, evaluating the e-turbo independent of the engine may produce more accurate and/or robust diagnostic results. For example, by performing the diagnostic strategies in the manner described herein a technician can avoid prevailing engine conditions that may mask subtle e-turbo performance changes. As another example, the diagnostic strategies may also enable a technician to avoid having to account for engine conditions that may make it difficult to observe e-turbo performance changes. By timely addressing structural and functional concerns with the e-turbo, engine system performance may be maintained.

The disclosure provides support for a method including monitoring an electric turbocharger (e-turbo) parameter or an engine parameter, comparing the monitored e-turbo or engine parameter to a determined threshold value for the e-turbo or engine parameter, and signaling a status of the e-turbo in response to the monitored e-turbo or engine parameter differing from the determined threshold value by at least a threshold amount. A first example of the method further includes where a motor of the e-turbo is operable to both provide torque to a shaft of the e-turbo and thereby to consume electricity provided to the motor, and to retard the shaft and thereby to generate electricity. A second example of the method, optionally including the first example, further includes where monitoring the e-turbo or engine parameter comprises operating a motor of the e-turbo at a commanded power level and monitoring a speed of the motor while the motor is operated at the commanded power level. A third example of the method, optionally including one or more of the previous examples, further includes where signaling the status of the e-turbo in response to the monitored e-turbo or engine parameter differing from the determined threshold value by at least the threshold amount comprises signaling a change in performance of the e-turbo in response to the monitored speed of the motor differing from a threshold speed by at least the threshold amount. A fourth example of the method, optionally including one or more of the previous examples, further includes where monitoring the e-turbo or engine parameter comprises operating a motor of the e-turbo at a commanded speed and monitoring a compressor outlet pressure at an outlet of a compressor of the e-turbo while the motor is operated at the commanded speed. A fifth example of the method, optionally including one or more of the previous examples, further includes where signaling the status of the e-turbo in response to the monitored e-turbo or engine parameter differing from the determined threshold value by at least the threshold amount comprises signaling a change in performance of the e-turbo in response to the monitored compressor outlet pressure differing from a threshold compressor outlet pressure by at least the threshold amount. A sixth example of the method, optionally including one or more of the previous examples, further includes where monitoring the e-turbo or engine parameter comprises operating a motor of the e-turbo at a commanded speed and monitoring a crankcase pressure at a crankcase of an engine operably coupled to the e-turbo while the motor is operated at the commanded speed. A seventh example of the method, optionally including one or more of the previous examples, further includes where signaling the status of the e-turbo in response to the monitored e-turbo or engine parameter differing from the determined threshold value by at least the threshold amount comprises signaling a change in performance of the e-turbo in response to the monitored crankcase pressure differing from a threshold crankcase pressure by at least the threshold amount. An eighth example of the method, optionally including one or more of the previous examples, further includes where monitoring the e-turbo or the engine parameter comprises monitoring the e-turbo or engine parameter during an engine off condition.

The disclosure provides further support for a method for an electric turbocharger (e-turbo) including during engine operation, obtaining an electrical current signal from a motor of the e-turbo, transforming the monitored electrical current signal to a frequency domain to form a frequency signal, and signaling a status of the e-turbo based on one or more frequency components of the frequency signal. A first example of the method further includes signaling the status of the e-turbo based on the one or more frequency components of the frequency signal comprises identifying a frequency component of interest of the e-turbo, comparing an amplitude of the frequency component of interest to a threshold amplitude, and signaling a change in performance of the e-turbo in response to the amplitude differing from the threshold amplitude by at least a threshold amount. A second example of the method, optionally including the first example, further includes where the frequency component of interest comprises a blade pass frequency of the e-turbo, the blade pass frequency determined based on a current speed of the e-turbo and an expected number of blades on a turbine and/or a compressor of the e-turbo. A third example of the method, optionally including one or more of the previous examples, further includes where the frequency component of interest comprises a once per revolution frequency of the e-turbo, the once per revolution frequency determined based on a current speed of the e-turbo. A fourth example of the method, optionally including one or more of the previous examples, further includes where the frequency component of interest comprises a rotor pole frequency of the motor of the e-turbo. A fifth example of the method, optionally including one or more of the previous examples, further includes where the motor on the e-turbo retards a flow of exhaust and generates electric current, and the electric current has a waveform that is analyzed for deviations from a threshold waveform.

The disclosure provides additional support for a system, comprising a controller configured to obtain an electric turbocharger (e-turbo) parameter of an e-turbo or an engine parameter of an engine configured to operably couple to the e-turbo, compare the e-turbo or engine parameter to a determined threshold value for the e-turbo or engine parameter, and signal a status of the e-turbo in response to the e-turbo or engine parameter differing from the determined threshold value by at least a threshold amount. A first example of the system optionally includes where the e-turbo or the engine parameter comprises a motor speed of a motor of the e-turbo, a compressor outlet pressure of a compressor of the e-turbo, or a crankcase pressure of the engine. A second example of the system, optionally including the first example, further includes where when the e-turbo or engine parameter is obtained, a turbine inlet of the e-turbo is disconnected from the engine and/or a compressor outlet of the compressor is disconnected from the engine. A third example of the system, optionally including one or more of the previous examples, further includes when the e-turbo or engine parameter is obtained, a motor of the e-turbo is operated at a commanded power level or at a commanded speed. A fourth example of the system, optionally including one or more of the previous examples, further includes where the e-turbo or engine parameter comprises a frequency component of a frequency signal of electric current of a motor of the e-turbo, and wherein comparing the e-turbo or engine parameter to the determined threshold value for the e-turbo or engine parameter comprises comparing an amplitude of the frequency component to a threshold amplitude.

In one embodiment, the control system, or controller, may have a local data collection system deployed and may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. The tasks may be machine learning problems such as classification, regression, clustering, density estimation, dimensionality reduction, anomaly detection, and the like. In examples, machine learning may include a plurality of mathematical and statistical techniques. The machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components are restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and control, behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the engine system should take. This may be useful for balancing competing constraints on the engine. During operation of one embodiment, a determination can occur by processing the inputs through the parameters of the neural network to generate a value at the output node designating that action as the desired action. This action may translate into a signal that causes the engine to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes. These may be weighed relative to each other.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that may incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
monitoring an electric turbocharger (e-turbo) parameter or an engine parameter associated with an e-turbo, while a motor of the e-turbo operates at a commanded speed, wherein the monitored e-turbo parameter or the engine parameter comprises a compressor outlet pressure monitored at an outlet of a compressor of the e-turbo while the motor is operated at the commanded speed;
comparing the monitored e-turbo parameter or the engine parameter to a determined threshold value for the e-turbo parameter or the engine parameter; and
signaling a status of the e-turbo in response to the monitored e-turbo parameter or the engine parameter differing from the determined threshold value by at least a threshold amount.

2. The method of claim 1, wherein the motor of the e-turbo is operable to both provide torque to a shaft of the e-turbo and thereby to consume electricity provided to the motor, and to retard the shaft and thereby to generate electricity.

3. The method of claim 1, wherein monitoring the e-turbo parameter or the engine parameter comprises operating the motor of the e-turbo at a commanded power level and monitoring a speed of the motor while the motor is operated at the commanded power level.

4. The method of claim 3, wherein signaling the status of the e-turbo in response to the monitored e-turbo parameter or the engine parameter differing from the determined threshold value by at least the threshold amount comprises signaling a change in performance of the e-turbo in response to the monitored speed of the motor differing from a threshold speed by at least the threshold amount.

5. The method of claim 1, wherein signaling the status of the e-turbo in response to the monitored e-turbo parameter or the engine parameter differing from the determined threshold value by at least the threshold amount comprises signaling a change in performance of the e-turbo in response to the monitored compressor outlet pressure differing from a threshold compressor outlet pressure by at least the threshold amount.

6. The method of claim 1, wherein monitoring the e-turbo parameter or the engine parameter comprises operating the motor of the e-turbo at the commanded speed and monitoring a crankcase pressure at a crankcase of an engine operably coupled to the e-turbo while the motor is operated at the commanded speed.

7. The method of claim 6, wherein signaling the status of the e-turbo in response to the monitored e-turbo parameter or the engine parameter differing from the determined threshold value by at least the threshold amount comprises signaling a change in performance of the e-turbo in response to the monitored crankcase pressure differing from a threshold crankcase pressure by at least the threshold amount.

8. The method of claim 1, wherein monitoring the e-turbo parameter or the engine parameter comprises monitoring the e-turbo parameter or the engine parameter during an engine off condition.

9. A method comprising:
obtaining an electrical current signal from a motor of an electric turbocharger (e-turbo), during operation of an engine;
transforming the obtained electrical current signal to a frequency domain to form a frequency signal;

identifying a frequency component of interest of the e-turbo, based on the frequency signal;

comparing an amplitude of the frequency component of interest to a threshold amplitude;

signaling a status of the e-turbo based on a change in performance of the e-turbo in response to the amplitude differing from the threshold amplitude by at least a threshold amount.

10. The method of claim 9, wherein the frequency component of interest comprises a blade pass frequency of the e-turbo, the blade pass frequency determined based on a current speed of the e-turbo and an expected number of blades on a turbine and/or a compressor of the e-turbo.

11. The method of claim 9, wherein the frequency component of interest comprises a once per revolution frequency of the e-turbo, the once per revolution frequency determined based on a current speed of the e-turbo.

12. The method of claim 9, wherein the frequency component of interest comprises a rotor pole frequency of the motor of the e-turbo.

13. The method of claim 9, wherein the motor of the e-turbo retards a flow of exhaust and generates electric current, and the electric current has a waveform that is analyzed for deviations from a threshold waveform.

14. A system, comprising:
a controller configured to:
obtain an electric turbocharger (e-turbo) parameter of an e-turbo or an engine parameter of an engine configured to operably couple to the e-turbo, wherein the e-turbo parameter or the engine parameter is obtained while a turbine inlet of the e-turbo is disconnected from the engine and/or a compressor outlet of a compressor is disconnected from the engine;

compare the e-turbo parameter or the engine parameter to a determined threshold value for the e-turbo parameter or the engine parameter; and signal a status of the e-turbo in response to the e-turbo parameter or the engine parameter differing from the determined threshold value by at least a threshold amount.

15. The system of claim 14, wherein the e-turbo parameter or the engine parameter comprises a motor speed of a motor of the e-turbo, a compressor outlet pressure monitored at an outlet of a compressor of the e-turbo, or a crankcase pressure of the engine.

16. The system of claim 14, wherein, when the e-turbo parameter or the engine parameter is obtained, a motor of the e-turbo is operated at a commanded power level or at a commanded speed.

17. The system of claim 14, wherein the e-turbo parameter or the engine parameter comprises a frequency component of a frequency signal of electric current of a motor of the e-turbo, and wherein comparing the e-turbo parameter or the engine parameter to the determined threshold value for the e-turbo parameter or the engine parameter comprises comparing an amplitude of the frequency component to a threshold amplitude.

* * * * *